United States Patent [19]
Swensen

[11] 4,016,637
[45] Apr. 12, 1977

[54] APPARATUS FOR ALIGNING PIPES

[76] Inventor: Donald E. Swensen, Valders, Wis. 54245

[22] Filed: Mar. 29, 1976

[21] Appl. No.: 671,079

[52] U.S. Cl. .............................. 29/281.4; 29/281.5; 29/272; 29/464; 228/44.5; 228/212

[51] Int. Cl.[2] .................. B23P 19/00; B23K 37/04

[58] Field of Search ............. 29/200 J, 200 P, 272, 29/271, 464, 467, 468; 228/212, 4.1, 6, 44.5, 49

[56] References Cited

UNITED STATES PATENTS

| | | | |
|---|---|---|---|
| 820,126 | 5/1906 | Phillips | 29/272 |
| 1,515,785 | 11/1924 | McDonald | 29/272 |
| 3,103,062 | 9/1963 | Himmelberger | 29/200 J |
| 3,551,983 | 1/1971 | Newbury | 29/200 P |
| 3,666,159 | 5/1972 | Watson | 29/200 P X |
| 3,704,503 | 12/1972 | Haywood | 29/200 P |
| 3,705,453 | 12/1972 | Olson | 228/44.5 X |
| 3,894,326 | 7/1975 | Merriman | 29/200 P |
| 3,920,232 | 11/1975 | Clark | 29/200 P X |

Primary Examiner—Victor A. Dipalma
Attorney, Agent, or Firm—James E. Nilles

[57] ABSTRACT

A method and apparatus for axially aligning the ends of pipes such as pile casings and the like and for supporting these ends in axially aligned relation while they are welded or otherwise secured together. The apparatus includes an alignment jig which can be releasably clamped around one end of a first pipe and includes a plurality of outwardly flared guides which are supported to extend beyond the end of the first pipe. The outwardly flared ends are intended to receive an end of a second pipe as that pipe is moved axially toward the first pipe and to guide that end into axial alignment with the end of the first pipe. The alignment jig is to be clamped to the end of the first pipe in such a manner as to permit free access to the seam formed between the two pipes to permit them to be welded together.

5 Claims, 7 Drawing Figures

APPARATUS FOR ALIGNING PIPES

BACKGROUND OF THE INVENTION

The present invention relates to a method and apparatus for providing a convenient, time-saving and economical means for axially aligning the ends of pipes such as pile casings to permit the pile casings to be welded together during a pile driving operation.

During a pile driving process, as a first pile is driven into the ground, a second pile or add-on is suspended vertically above the first by means of a crane or the like, and lowered onto the projecting end of the first pile. The ends of the two piles must be accurately aligned so that they can be welded together around their seam line. Due to the size and mass of the pile casings, alignment of their ends is often a difficult process, and as a result, unnecessary amounts of time are often wasted to accommodate alignment of the pipes.

Previously, the ends of the pile casings have generally been aligned manually without the aid of assisting devices. However, since the piles are usually suspended from booms and long cables or the like and are consequently unstable and because they are massive, this is an awkward and time-consuming task. Chill rings or sleeves are sometimes secured within the upper end of the lower pipe casing and project out of this end to provide a means for preventing shifting of the ends of the casings once they have been properly aligned. Chill rings do not function, however, to provide a means for aligning the ends of the pile casings, and in the event the casings are misaligned when the pile casings are brought together, the weight of the upper casing will frequently drive the chill ring into the lower casing and make it useless.

SUMMARY OF THE INVENTION

The present invention provides an improved method and apparatus for aligning pile casings and the like and for supporting the ends of the pile casings in axially aligned relationship while they are welded or otherwise secured together. The apparatus includes an alignment jig which can be releasably clamped around one end of a first pipe and which includes a plurality of outwardly flared guides which are to extend beyond the end of the first pipe to receive an end of a second pipe therebetween as that pipe is moved axially toward the first pipe. The structure of the alignment jig is such that it can be securely and immoveably clamped to the end of the first pipe but slideably receive the end of a second pipe having a diameter equal to that of the first.

More specifically, the alignment jig can include a pair of relatively moveable hinged curved bands which are to be received around the end of the pile casing. The ends of the curved bands are joined by a clamping assembly functional to permit the jig to be rigidly secured around the end of the pipe. A plurality of flared guides are welded to the curved bands in spaced relation and are intended to be aligned generally parallel to the axis of the lower pile casing and positioned around its periphery. When the alignment jig has been secured to the end of the casing, the guides are positioned around the periphery of the casing and are flared outwardly. When a second casing is lowered toward the end of the first casing, it can be received by the flared guides and slideably aligned by the guides with the end of the first casing as it is moved toward the first casing.

The alignment jig of the invention has the substantial advantage of greatly decreasing the time required and consequent expense inherent in aligning the pile casings. Furthermore, the alignment jig can be conveniently and rapidly secured to and removed from the pile casings. The use of the alignment jig to maintain the casing ends in alignment can also eliminate the cost of the use of chill rings or sleeves previously used to hold the casings in alignment. The alignment jig also has the advantage that it does not substantially obstruct access to the seam between the casings and thus facilitates the welding process. The alignment jig also includes adjustment means to permit variance of its circumference so that it can be used to align various sized casings.

These and other advantages of the method and apparatus of the invention will be described more clearly in the following description of a preferred embodiment of the invention and in the drawings. Though only two embodiments of the invention are shown in the drawings and described herein, the invention also encompasses all similar concepts not inconsistent with the claims.

DESCRIPTION OF THE PREFERRED EMBODIMENT

Figure 1:
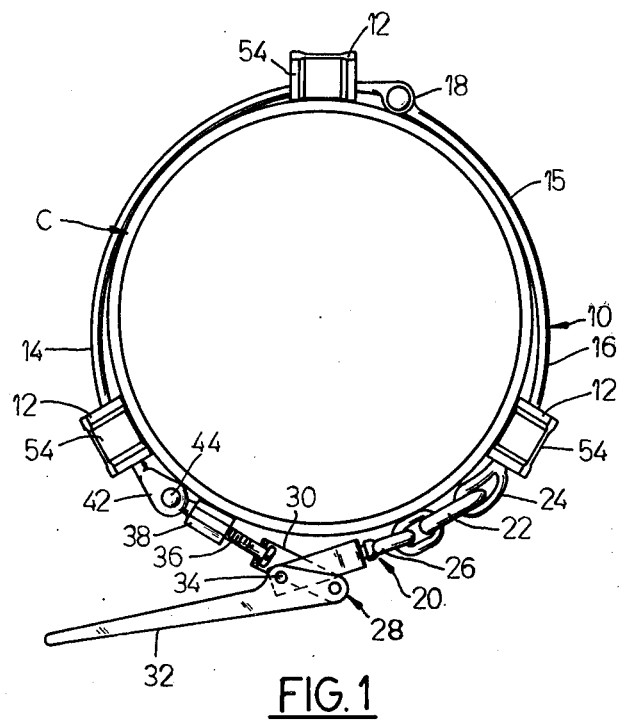
FIG. 1 is a plan view of an alignment jig of the present invention.
Figure 2:
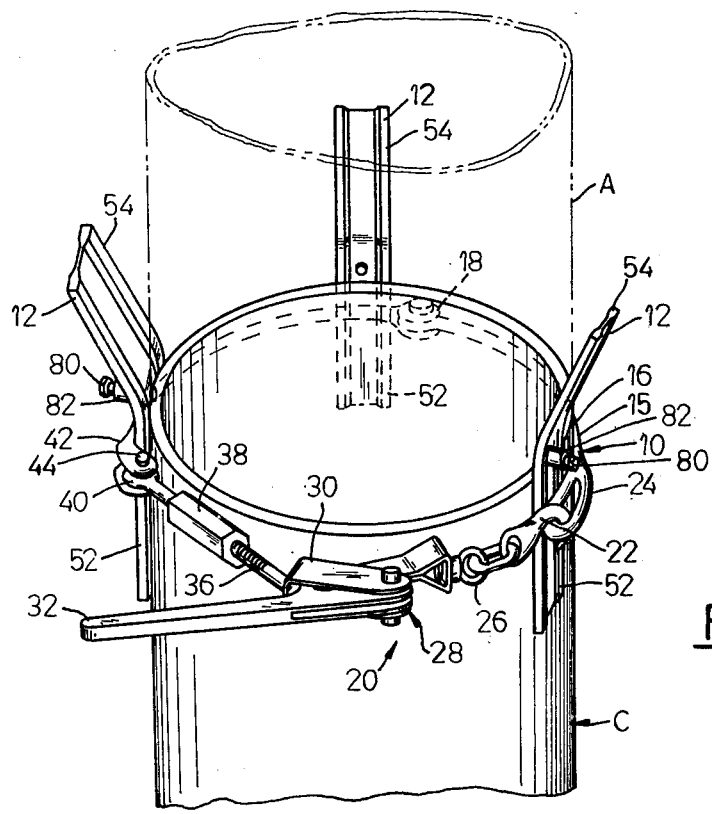
FIG. 2 is a perspective view of the alignment jig shown in FIG. 1 received in clamped engagement around a pile casing.

The method and apparatus of the present invention for axially aligning the ends of pipes such as pile casings, for example, and for supporting these pipes are shown generally in FIGS. 1 and 2. The apparatus comprises an alignment jig 10 which is to be securely clamped around the upper end of a pile casing C. The alignment jig includes a plurality of projecting guides 12 which extend upwardly and are flared radially outwardly at their upper ends to receive the lower end of a second pile casing or add-on A. As pile casing A is moved toward the upper end of pile casing C and in general alignment with it, the end of pile casing A is received between the guides 12 and slideably channelled toward the end of the casing C as it is further lowered. When the casings A and C are received in abutting relationship, the alignment jig further functions to prevent any lateral movement of the casings while they are welded together.

The alignment jig 10 includes a flexible band 15 comprised of a pair of rigid curved members 14 and 16 which are joined by a hinge 18. The flexible band 15 could also be comprised of any strong, flexible device which can be received around the pile casing, such as a roller chain or the like. The ends of the curved members 14 and 16 are joined by a clamping assembly 20 which includes a hook 22 receivable in a loop 24 in the end of the curved member 16. The hook 22 is connected by means of a swivel 26 to an over-center toggle assembly 28 comprised of a clevis 30 pivotably supporting an over-center toggle lever 32. One end of the over-center toggle lever 32 is connected to the swivel 26 by means of a pin 34. The clevis 30 includes a bore for receiving a bolt 36 which is threadably received within a threaded coupling 38. The coupling 38 includes a ring 40 which is received within a clevis 42 in the end of the curved member 14 and is pivotably secured therein by a pin 44 received through aligned bores in the clevis 42 and through the ring 40.

Figure 3:
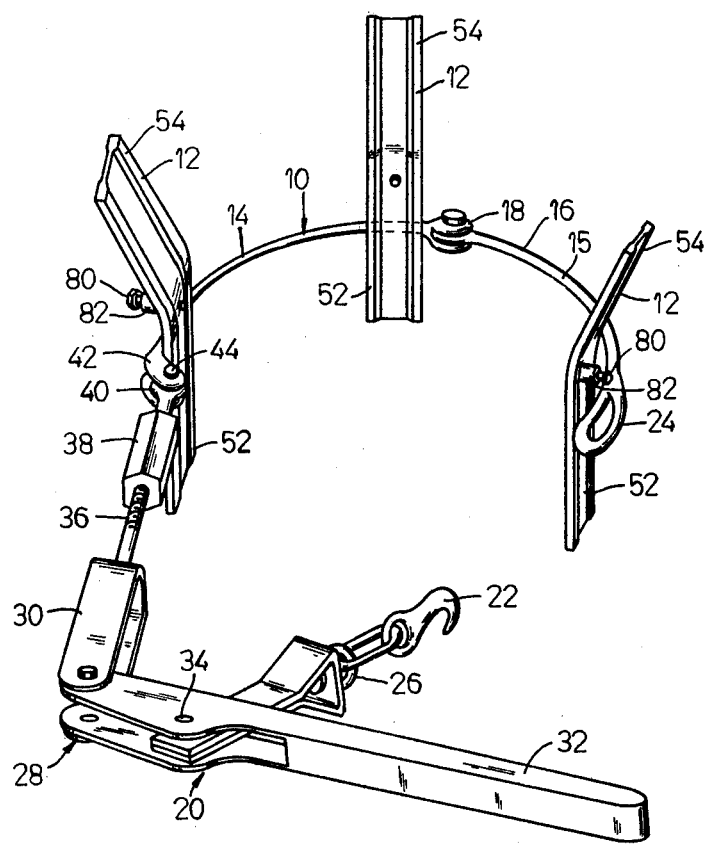
FIG. 3 is a perspective view of the alignment jig shown in FIGS. 1 and 2 in an open position.

In operation, the flexible band can be received around the upper end of a pile casing or the like and the hook 22 can be positioned in the loop 24. The over-center toggle assembly 28 can then be used to rigidly clamp the alignment jig 10 around the upper end of the pile casing C as shown in FIGS. 1 and 2. In order to remove the alignment jig 10, the over-center toggle assembly 28 can be released and the flexible band 15 hingeably opened as shown in FIG. 3 to permit removal of the alignment jig from the pile casing. By providing the bolt 36 and threaded coupling 38, the length of the clamping assembly 20 can be adjusted to permit use of the alignment jig with pile casings of varied diameters.

The alignment jig 10 further includes a plurality of guides 12 which are rigidly secured in spaced relation to the curved members 14 and 16 by welding or the like. The guides 12 are generally mutually parallel and are positioned with respect to the members 14 and 16 such that, when the alignment jig 10 is clamped around the end of the pile casing C, the guides extend substantially parallel to the axis of the casing C. Each of the guides 12 includes a lower portion 52 receivable in clamped engagement against the pile casing C and an outwardly flared portion 54 which is intended to project beyond the end of the casing C when the alignment jig is clamped around the pile casing C and to provide means to slideably receive and align the end of the pile casing A. When the alignment jig 10 is clamped around the casing C, the flared portions 54 of the guides 12 thus comprise a funnel-shaped configuration, the lower end of this configuration having a diameter substantially equal to the outside diameter of the pile casings A but sufficiently large to slideably receive the end of the pile casings. Though the guides 12 shown in FIGS. 1 and 2 are shown as being rigidly secured to the flexible band, it is also possible to provide means for slideably supporting the guides 12 on the flexible band so that their position with respect to the periphery of the pile casing can be adjusted.

Figure 5:
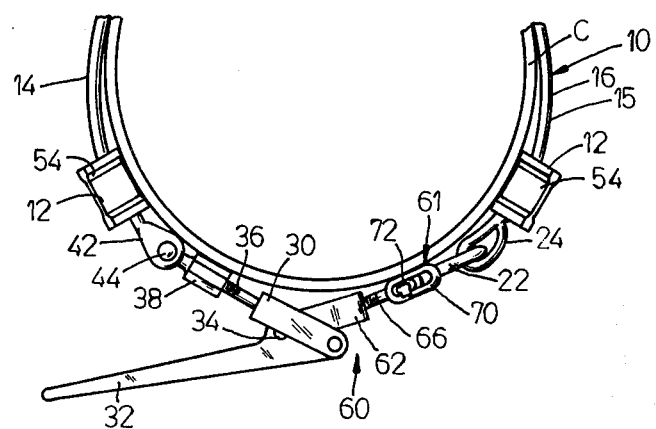
FIG. 5 is a view similar to that shown in FIG. 1 but showing an alternative embodiment of the alignment jig of the invention and having a length adjustment mechanism.
Figure 6:
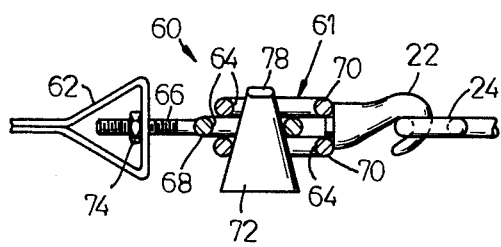
FIGS. 6 and 7 are enlarged partial cross-sectional views of the length adjustment mechanism shown in FIG. 5.
Figure 7:
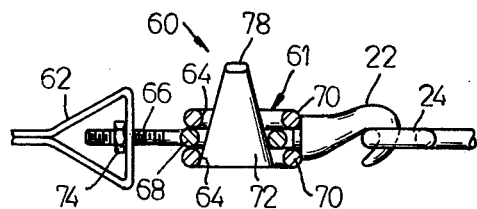

An alternative clamping assembly 60 for use with the alignment jig 10 is shown in FIGS. 5–7 wherein the swivel 26 has been replaced by a length adjustment assembly 61 used to quickly compensate for use of the alignment jig on pipes of an alternate diameter. The length adjustment assembly 61 includes a bracket 62 which is pivotably connected to the toggle lever 32 by pin 34 and includes a bore in its end for receiving a bolt 66. The bolt 66 in turn supports a generally oblong link 68 which is receivable between a pair of vertically spaced parallel oblong links 70 integrally connected to the hook 22. A wedge 72 is inserted through the aligned bores 64 in the oblong links 68 and 70 to prevent separation of these members. As shown in FIGS. 6 and 7, the vertical position of the wedge 72 can be varied to control the relative positions of the oblong links 68 and 70 and thus provide means to increase or reduce the circumference of the alignment jig. The alignment jig 10 can be further securely clamped around the end of the pile casing by tightening a nut 74 received on the end of eye-bolt 66 to cause contraction of clamping assembly 60. The wedge 72 includes a stop 78 attached to its upper end to prevent it from being completely removed from the oblong links.

Though the alignment jig 10 is shown as being clamped onto the lower casing C for receiving the end of add-on pile casing A, where circumstances dictate, the alignment jig could also be clamped onto the end of the add-on pile casing A instead such that the outwardly flared portions 54 of the guides 12 receive the end of the lower pile casing C as the add-on pile casing A is lowered toward casing C.

Figure 4:
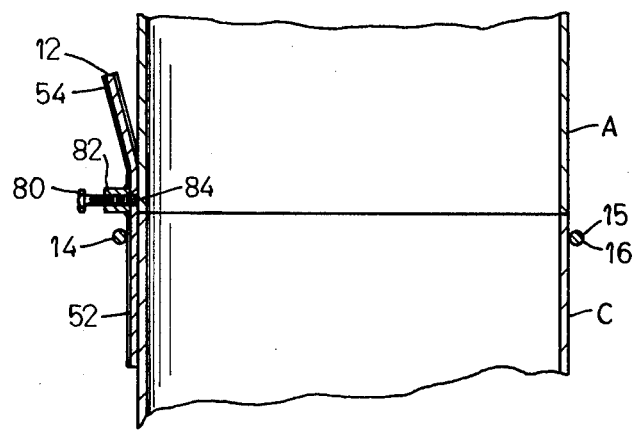
FIG. 4 is a cross-sectional elevation view of the alignment jig shown in FIGS. 1-3 used to align a pair of pile casings.

As shown in FIGS. 2–4, the guides 12 can also include aligning screws 80 threadably received within nuts 82 welded to the guides 12. The screws can project through bores 84 in the guides 12 and can be used to accurately align two casings received in the alignment jig 10.

The alignment jig 10, shown in the drawings, is illustrated as for use with cylindrical piling, but similar alignment jigs are equally useful to align pile casings having other shapes, such as those having an H-shaped cross-sectional configuration provided the flexible band is either substantially flexible or suitably shaped.

I claim:

1. A removable alignment jig for use in axially aligning and supporting pipes in abutting end-to-end relationship to facilitate their being secured together, said jig comprising: clamping means for clampingly engaging a first pipe near but axially spaced from an end thereof in rigid non-slideable engagement, said clamping means including a flexible band having opposite ends, a clamp assembly connected to one end of said flexible band and means for releasably engaging said clamp assembly with the other end of said flexible band, said flexible band comprising at least two substantially rigid curvilinear members and hinge means for hingedly securing said members together, and a plurality of guide means for slideably receiving an end of a second pipe while said clamping means clampingly engages said first pipe and for guiding and supporting said second pipe in axial abutting alignment with said first pipe, said plurality of guide means each being rigidly secured to said flexible band and positioned in spaced relationship with respect to each other, said guide means each including an elongated portion extendable along and beyond the said end of said first pipe in parallel non-sliding relationship and an elongated outwardly diverging end portion extendable beyond the said end of said first pipe for slideably receiving said end of said second pipe when said clamping means is engaged around said end of said first pipe for aligning said second pipe with respect to said first pipe as said second pipe is moved axially toward said first pipe and for supporting said pipes in abutting end-to-end relationship thereafter.

2. The removable alignment jig set forth in claim 1 wherein said clamp assembly includes an over-center toggle locking means.

3. The removable alignment jig set forth in claim 2 wherein said clamp assembly includes a linkage having means for adjusting the length of said linkage.

4. The removable alignment jig set forth in claim 3 wherein said linkage includes a first loop having an oblong bore therein and a second loop having an oblong bore therein, said loops being alignable whereby said bores overlap, and a tapered wedge for insertion through said oblong bores to prevent separation of said loops and to effect adjustment of the length of said linkage.

5. The removable alignment jig set forth in claim 3 wherein said linkage includes a threaded coupling.

* * * * *